United States Patent [19]
Kan et al.

[11] Patent Number: 5,927,414
[45] Date of Patent: Jul. 27, 1999

[54] WHEELCHAIR

[75] Inventors: Yuji Kan; Minoru Kitano; Kazuhiro Tomoshige; Hideo Nakamura, all of Kasai, Japan

[73] Assignee: Sanyo Electric Co., Ltd., Japan

[21] Appl. No.: 08/688,304

[22] Filed: Jul. 30, 1996

[30] Foreign Application Priority Data

Jul. 31, 1995 [JP] Japan ................................ 7-195022

[51] Int. Cl.⁶ .................................................. B62D 51/04
[52] U.S. Cl. ........................ 180/19.3; 180/6.5; 180/65.1; 180/907
[58] Field of Search ................................ 180/19.1, 19.2, 180/19.3, 6.48, 6.5, 11, 13, 65.1, 65.8, 907

[56] References Cited

U.S. PATENT DOCUMENTS

| | | | |
|---|---|---|---|
| 3,802,524 | 4/1974 | Seidel | 180/6.5 |
| 3,893,529 | 7/1975 | Karchak | 180/907 |
| 5,125,468 | 6/1992 | Coker | 180/13 |
| 5,161,634 | 11/1992 | Ichihara et al. | 180/65.1 |
| 5,497,056 | 3/1996 | Kurland | 180/907 |
| 5,648,708 | 7/1997 | Littlejohn | 180/907 |
| 5,732,786 | 3/1998 | Fujigaki | 180/19.3 |

FOREIGN PATENT DOCUMENTS

| | | |
|---|---|---|
| 0675037 | 3/1995 | European Pat. Off. . |
| 30687454 | 12/1995 | European Pat. Off. . |
| 40691232 | 1/1996 | European Pat. Off. . |
| 50707842 | 4/1996 | European Pat. Off. . |
| 22292918 | 3/1996 | United Kingdom . |
| 19505141 | 2/1995 | WIPO . |

OTHER PUBLICATIONS

Abel et al., An Evaluation of Different Designs of Providing Powered Propulsion for Attendant Propelled Wheelchairs, Oct. 31, 1991, pp. 1863–1864.

*Primary Examiner*—Anne Marie Boehler
*Attorney, Agent, or Firm*—Morrison Law Firm

[57] ABSTRACT

A less heavy and small-sized assisted wheelchair that does not require so much manual labor of an assistant's handle operation. The wheelchair D comprises a frame assembly 1, casters 2 and 3, driving wheels 4 and 5, handrims 6 and 7, and a battery portion 11. In the inside of the casing 14 which covers the hub shaft 13 of the driving wheel 4, there are disposed a driving force detector 40 for detecting the human driving force applied to the handrim 6, a motor 21 for auxiliarily driving the driving wheel 4, and a controller 20 for controlling the motor 21 based on the result of the detection by the driving force detector 40. Also, on the upper rear portion of the frame assembly 1, there is disposed a driving force detector 50 for detecting the human driving force applied to the handles 8 and 9 by the assistant. The controller 20 controls and drives the motor 21 in accordance with the amount of human driving force of the assistant detected by the driving force detector 50.

15 Claims, 11 Drawing Sheets

WHEELCHAIR

BACKGROUND OF THE INVENTION

1. Field of the Invention

The present invention relates to a wheelchair. More particularly, the present invention relates to an assisted wheelchair having a driving wheel.

2. Description of the Related Arts

Conventionally, there are two types of assisted wheelchairs having a driving wheel. One type thereof is a manually-operated assisted wheelchair having a handle for transmitting the human driving force generated by pushing or pulling operation of an assistant to a driving wheel to propel the main body, the wheelchair being intended to be run by the human power of the assistant. The other type is an electrically-operated assisted wheelchair having a driving motor, a decelerator, and a battery for power supply, the wheelchair being intended to be run electrically by the motor.

The manually-operated assisted wheelchair is a wheelchair run by rotation of a driving wheel generated by the assistant's operation of a handle with a hand. Therefore, it is necessary to employ a labor of operating the handle, so that the assistant is liable to get tired when one wants to go for a long distance or when the wheelchair is used on an upward slope, thus rendering the use thereof difficult.

On the other hand, the electrically-operated wheelchair is considerably heavy and large-sized because of a large capacity battery which the wheelchair carries, so that it has been extremely difficult to load the wheelchair on an automobile or a truck. Also, since the turning radius is large contrary to the manually-operated assisted wheelchair, the electrically-operated assisted wheelchair cannot turn in a small circle, so that the use in a small space such as in a room has been restricted.

The present invention has been made in view of the above circumstances and the main purpose thereof is to provide a comparatively less heavy and small-sized assisted wheelchair that does not need so much manual labor of the assistant's handle operation.

SUMMARY OF THE INVENTION

The present invention provides a wheelchair comprising a main body having a seat for a user and a driving wheel, a handle provided in the main body for propelling the main body by a human driving force of an assistant, a motor for auxiliarily driving the driving wheel by an electric driving force, and a battery for supplying a power to the motor, a handle driving-force detector for detecting the human driving force applied to the handle, and a controller for controlling the motor reflecting a result of the detection by the handle driving-force detector, whereby the electric driving force can be added to the driving wheel in accordance with the human driving force applied to the handle.

DETAILED DESCRIPTION OF THE PREFERRED EMBODIMENTS

Figure 1:
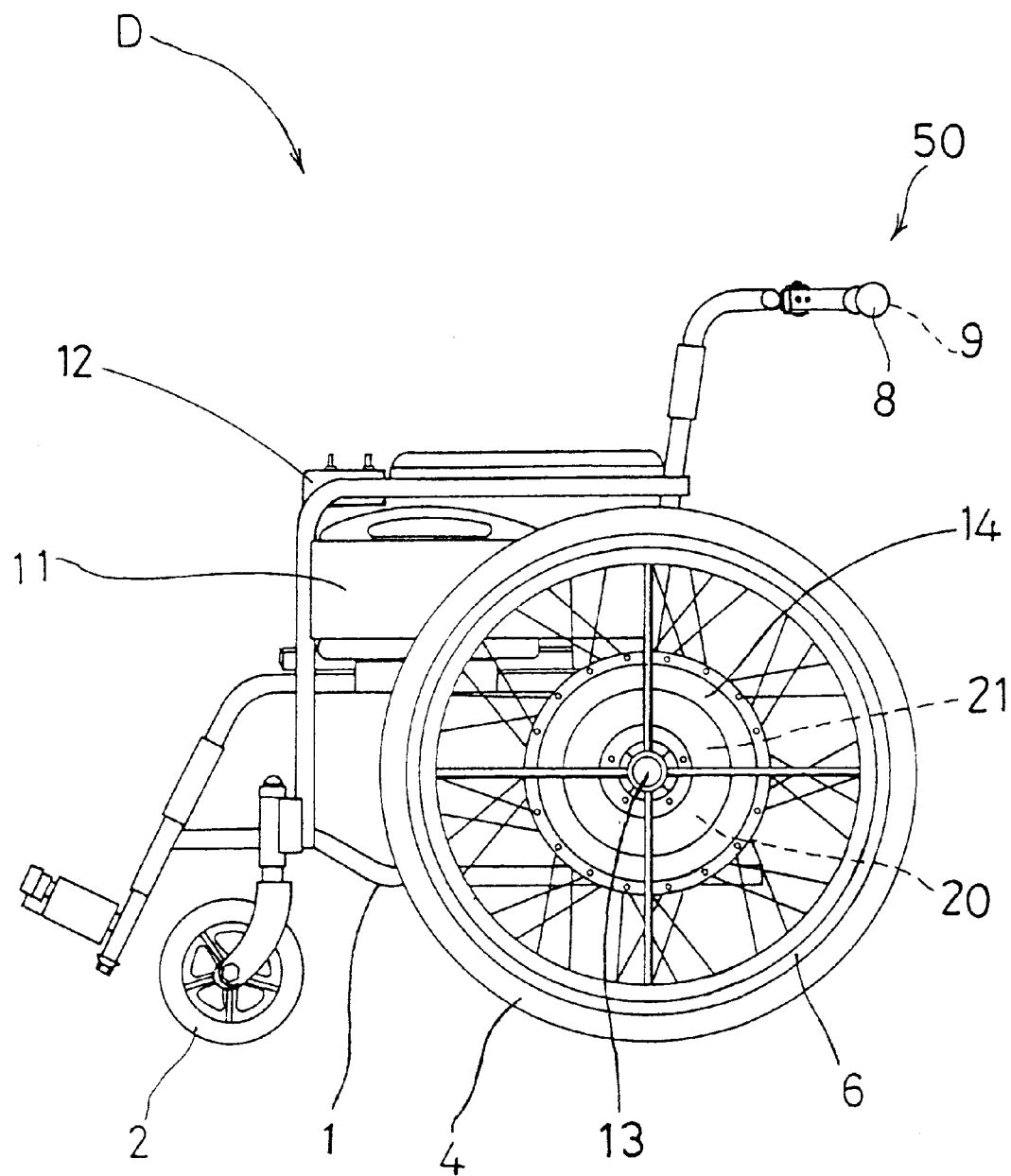
FIG. 1 is a side view showing an overall outlook of a wheelchair according to an embodiment of the present invention.

The main body of the wheelchair generally comprises a frame assembly. The frame assembly comprises a right frame, a left frame, and a cross rod. The user seat may be formed integrally or non-integrally with the frame assembly.

The driving wheel may be either a front wheel or a rear wheel as long as the human driving force of the assistant constituting the main driving force of the wheelchair can be transmitted to the driving wheel. Generally, a pair of front wheels are provided as casters, and a pair of rear wheels are provided as driving wheels. The handle is mounted, for example, in a pair on right and left sides of the upper rear portion of the main body, i.e. the frame assembly, so as to transmit to the main driving wheel the human driving force based on the pushing or pulling operation of the assistant's hand (a forward pushing operation or a backward pulling operation) to propel the main body.

The motor is provided so as to auxiliarily drive the driving wheel. Namely, when a certain amount of human driving force is applied to the driving wheel from the handle by the assistant, the motor operates to apply an electric driving force to the driving wheel at a predetermined ratio.

The motor usually comprises a decelerator. A combination of a pulley and a belt, a combination of decelerating gears, or both may be used as the decelerator. In order to suppress the noise, it is preferable to use an element mainly consisting of a combination of a pulley and a belt.

The battery for power supply may be an element comprising a battery such as a rechargeable dry battery, a rechargeable storage battery, or a non-rechargeable dry battery and a case for housing a predetermined number of these batteries.

The handle driving-force detector detects an amount of the human driving force applied to the handle. The handle driving-force detector may be, for example, an element comprising a pressure sensor detecting the amount of power for pushing the handle forward, an element comprising a pressure sensor detecting the amount of power for pulling the handle backward, or an element comprising a pressure sensor detecting the amount of power for pushing the handle forward and detecting the amount of power for pulling the handle backward.

The controller mainly reflects an amount of the human driving force detected by the handle driving-force detector to control the motor. However, the controller may control the motor also in response to a rotation speed of the driving wheel or a travelling speed of the wheelchair which is detected by an appropriate means. Thus, the controller may be constructed to operate, for example, (a) so that the motor is controlled for applying a large or small electric driving force to the driving wheel depending on whether the detected human driving force is large or small, respectively; (b) so that the motor is controlled for applying the same amount of electric driving force to the driving wheel as the detected human driving force when a travelling speed of the wheelchair is within a certain range and for applying a smaller amount of electric driving force to the driving wheel than the detected human driving force when the travelling speed exceeds the above range; or (c) so that the motor is controlled for applying the electric driving force to the driving wheel depending on whether the wheelchair is travelling on a flat land or on a slope (an upward slope or a downward slope).

If the handle driving-force detector comprises a pressure sensor detecting the amount of power for pulling the handle backward, the controller preferably has a function of directing the dynamoelectric braking to the motor depending on the result of the detection by the pressure sensor, namely, the amount of power for pulling the handle backward. If the controller has such a function, it is possible to direct a dynamoelectric braking to the motor to suppress the speed when the wheelchair is travelling on a downward slope or the like with the speed being increased and dangerous.

Preferably, the wheelchair according to the present invention further comprises a handrim provided integrally with the driving wheel for driving the driving wheel with the human driving force of a user and a handrim driving-force detector for detecting the human driving force applied to the handrim, the controller further having a function of controlling the motor reflecting the result of the detection by the handrim driving-force detector, whereby the electric driving force can be added to the driving wheel in accordance with the human driving force applied either to the handle or to the handrim.

If the wheelchair is constructed as above, the handrim driving-force detector detects the amount of human driving force applied to the handrim. The handrim driving-force detector comprises an elastic body that contracts when a human driving force exceeding a predetermined amount is applied to the handrim and expands otherwise, a converting member for converting the amount of contraction or expansion of the elastic body into a shift amount along the longitudinal direction of a hub shaft of the driving wheel, and a detecting member for generating an electric output change in accordance with the shift amount of the converting member and for detecting the output.

Here, in addition to the function of controlling the motor reflecting the amount of human driving force detected by the handle driving-force detector, the controller has a function of controlling the motor reflecting the result of the detection by the handrim driving-force detector, whereby the electric driving force can be added to the driving wheel in accordance with the human driving force applied either to the handle or to the handrim. The controlling method may be (a), (b), or (c) in the above.

EXAMPLES

The present invention will be hereinafter explained in detail by way of preferred embodiments in conjunction with the attached drawings, which are not intended to limit the scope of the present invention. Here, the term "left" represents the left side of the wheelchair when a user sits thereon, and the term "right" represents the right side thereof.

Figure 2:
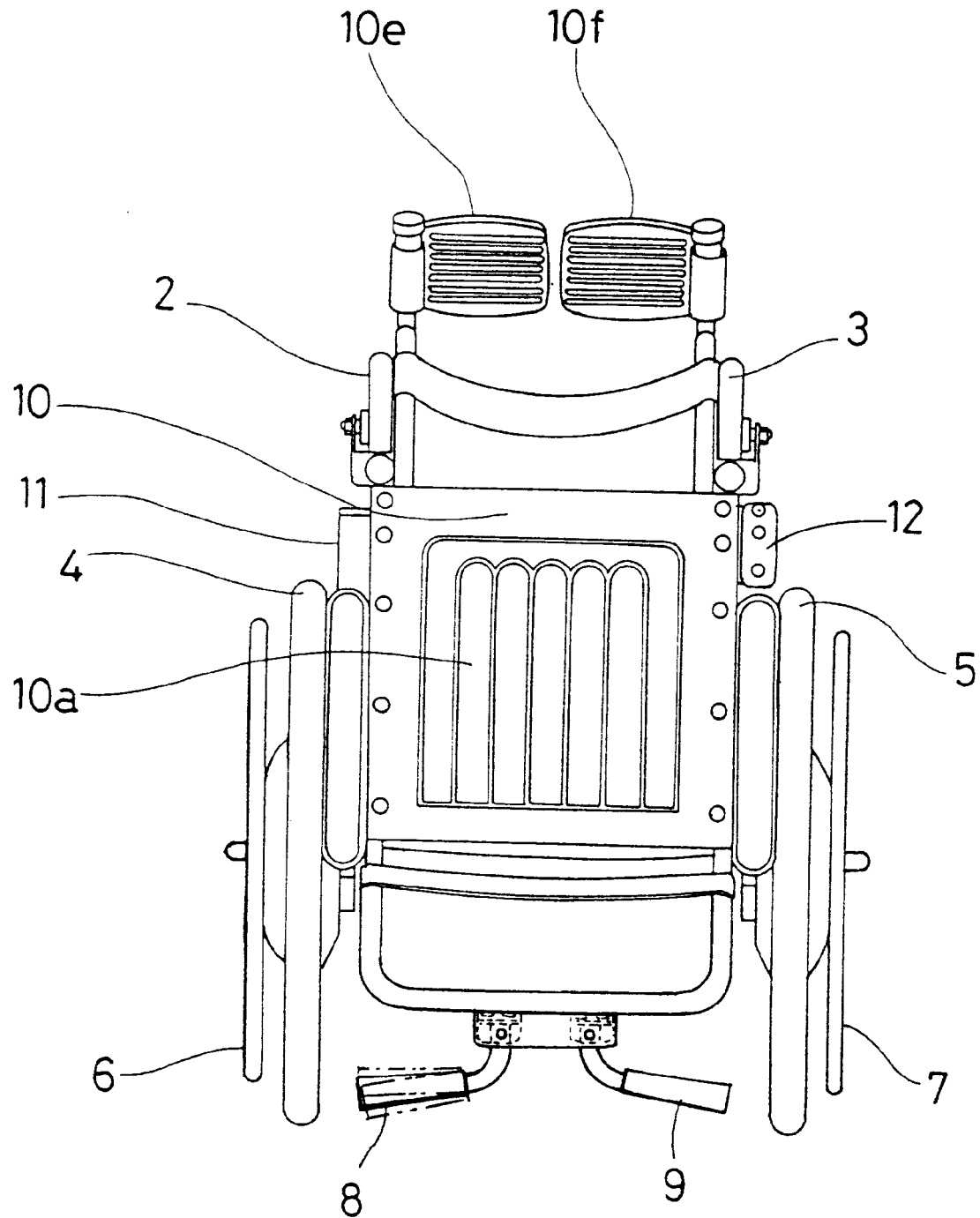
FIG. 2 is a plan view showing the wheelchair of FIG. 1.
Figure 3:
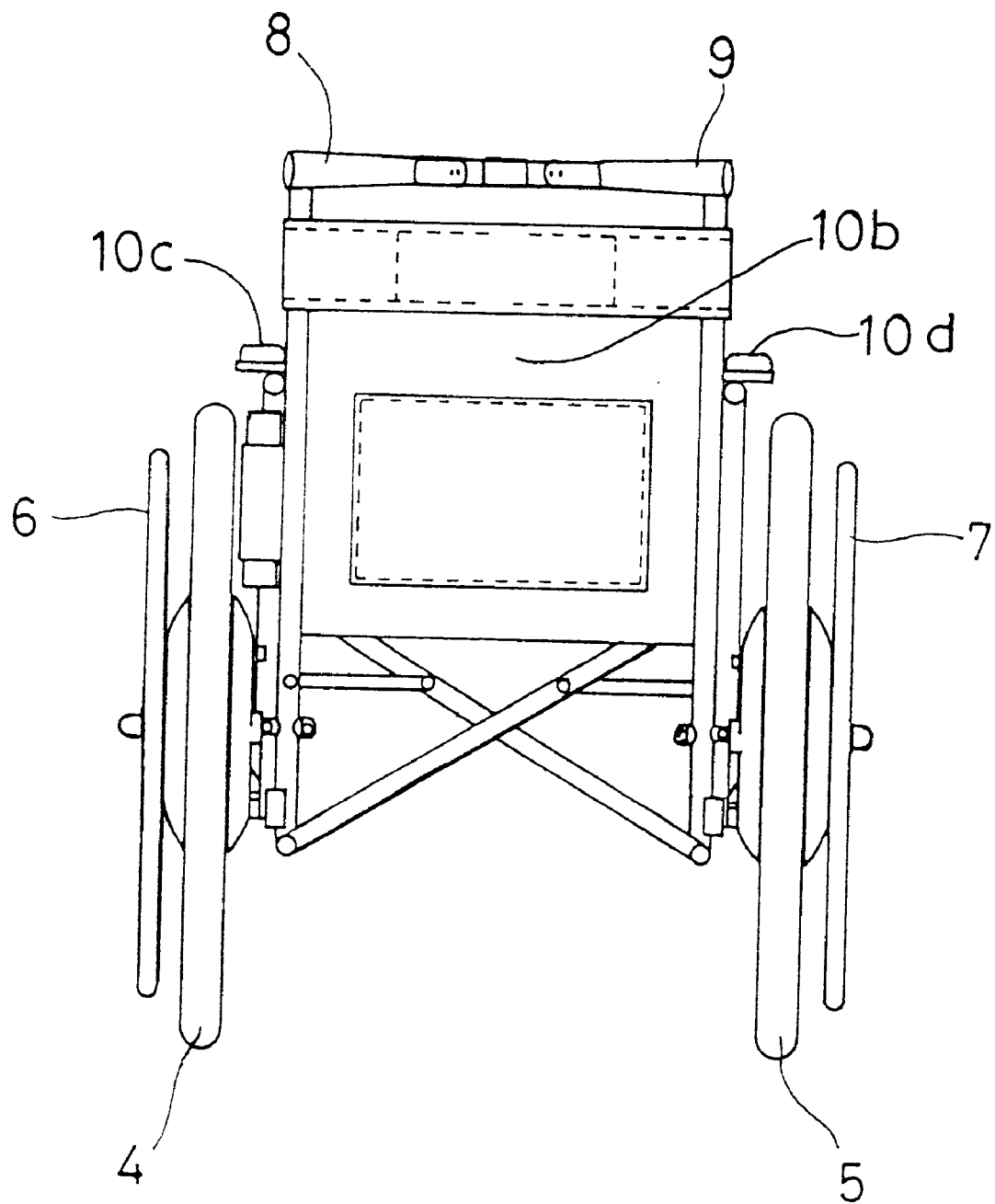
FIG. 3 is a rear view showing the wheelchair of FIG. 1.

FIGS. 1 to 3 are views showing an outlook construction of the wheelchair D according to an embodiment of the present invention.

In FIGS. 1 to 3, the wheelchair D is mainly constructed with a frame assembly 1 which forms a main body, a pair of right and left casters (front wheels) 2 and 3 supported by the front portion of the frame assembly 1, a pair of right and left driving wheels (rear wheels) 4 and 5 supported by the rear portion of the frame assembly 1, a pair of right and left handrims 6 and 7 mounted to the driving wheels 4 and 5, respectively, for driving the driving wheels 4 and 5 by the human driving force of the user, a pair of right and left handles 8 and 9 provided on the upper rear portion of the frame assembly 1 for propelling the main body by transmitting a human driving force of an assistant which is a main driving force of the wheelchair D to the driving wheels 4 and 5, respectively, a seat unit 10 disposed in the central portion of the frame assembly 1 for the user, and a battery portion 11 disposed on the left side of the frame assembly 1 for power supply.

The seat unit 10 comprises a seat 10a, a backrest 10b, a pair of right and left armrests 10c and 10d, a pair of right and left footrests 10e and 10f, and others.

Figure 4:
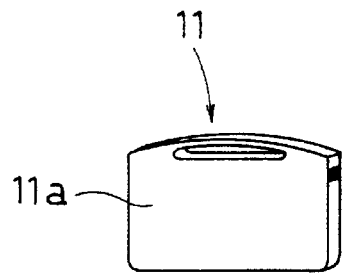
FIG. 4 is a perspective view showing a battery portion which is a constituting member of the wheelchair of FIG. 1.

The battery portion 11 comprises a battery case 11a having a grip having a generally rectangular front shape and twenty rechargeable dry batteries of size D type (1.2 V×20= 24 V) housed inside the battery case 11a, as shown in FIG. 4.

Figure 5:
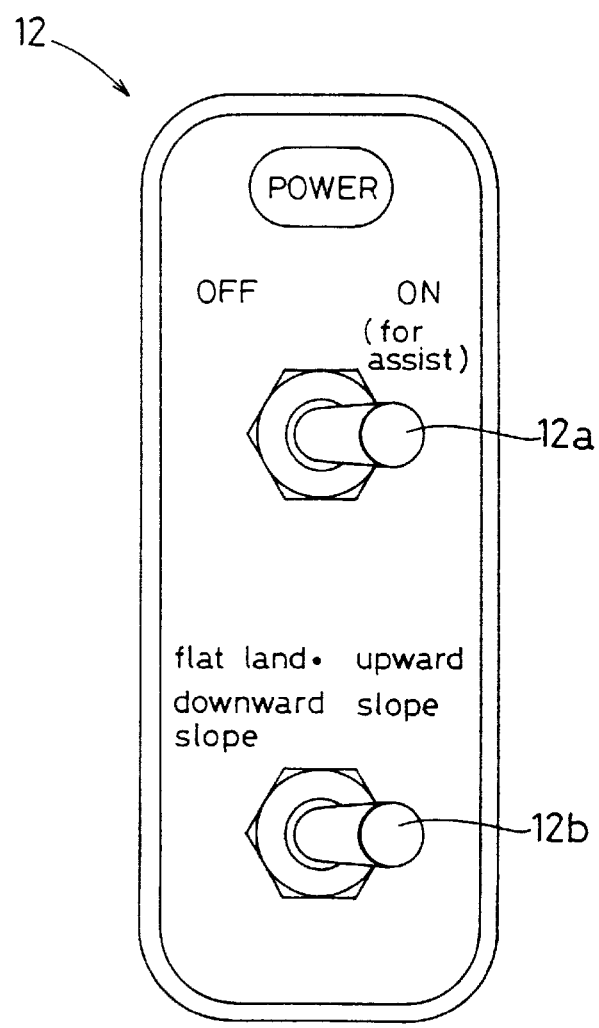
FIG. 5 is a plan view showing a changeover switch which is a constituting member of the wheelchair of FIG. 1.

On the right front side of the seat 10a is disposed a changeover switch 12 operated by the user or the assistant. The changeover switch 12 includes a first switch 12a for turning the power on and off to select whether the electric driving force is to be added to the driving wheels 4 and 5, and a second switch 12b for changing the ratio of the electric driving force to be added depending on whether the wheelchair D is travelling on a flat (level) land or downward slope, or travelling on an upward slope when the power is on, as shown also in FIG. 5.

Next, the inner structures and the functions of the right and left driving wheels 4 and 5 and the right and left handrims 6 and 7 will be hereafter explained. Since they are symmetrical with respect to the right and left, an explanation will be given on only one of them (the right hand side or the left hand side), and the explanation of the other will be omitted.

Figure 6:
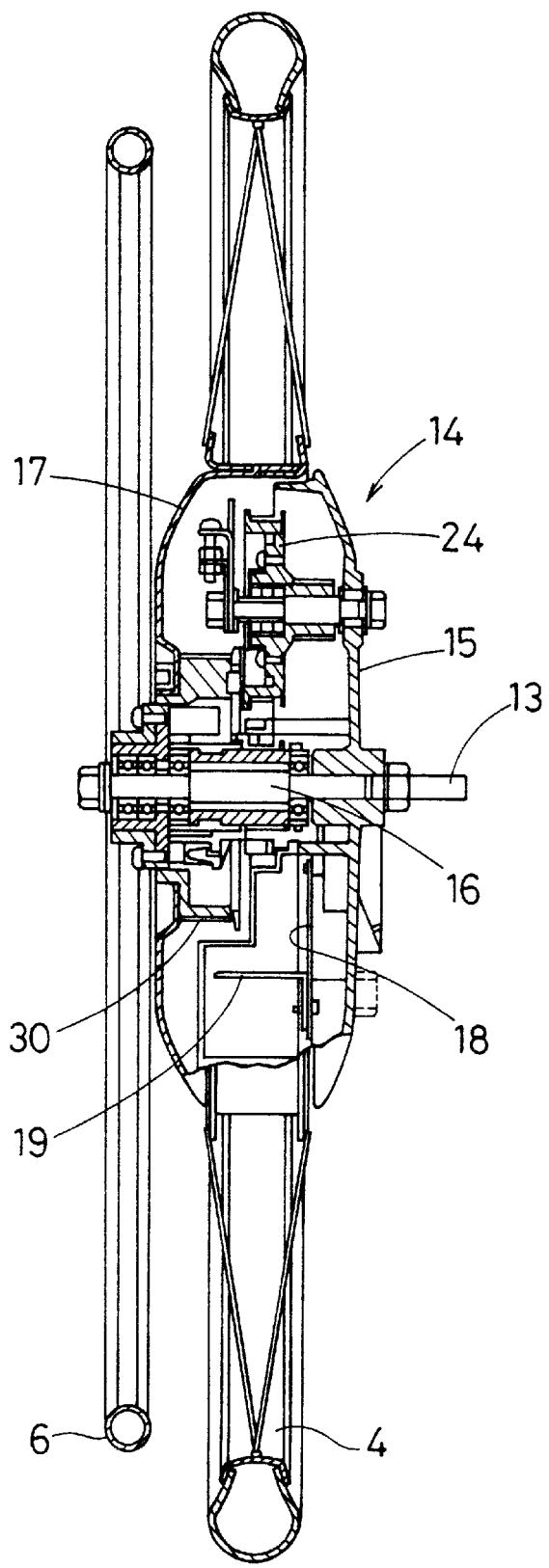
FIG. 6 is a rear sectional view showing a casing which is a constituting member of the wheelchair of FIG. 1.

The hub shaft 13 of the driving wheel 4 is protected by a disk-like casing 14, as shown in FIG. 6. The casing 14 is divided into right and left portions. The right hand member of the divided casing 14 is fixed to the hub shaft 13 and serves as a fixed-side casing member 15. The left hand member of the divided casing 14 is mounted to the hub shell 16 covering the hub shaft 13, the left hand member being integral with the handrim 6 to serve as a rotative-side casing member 17 rotatable with the handrim 6 and the driving wheel 4.

Figure 7:
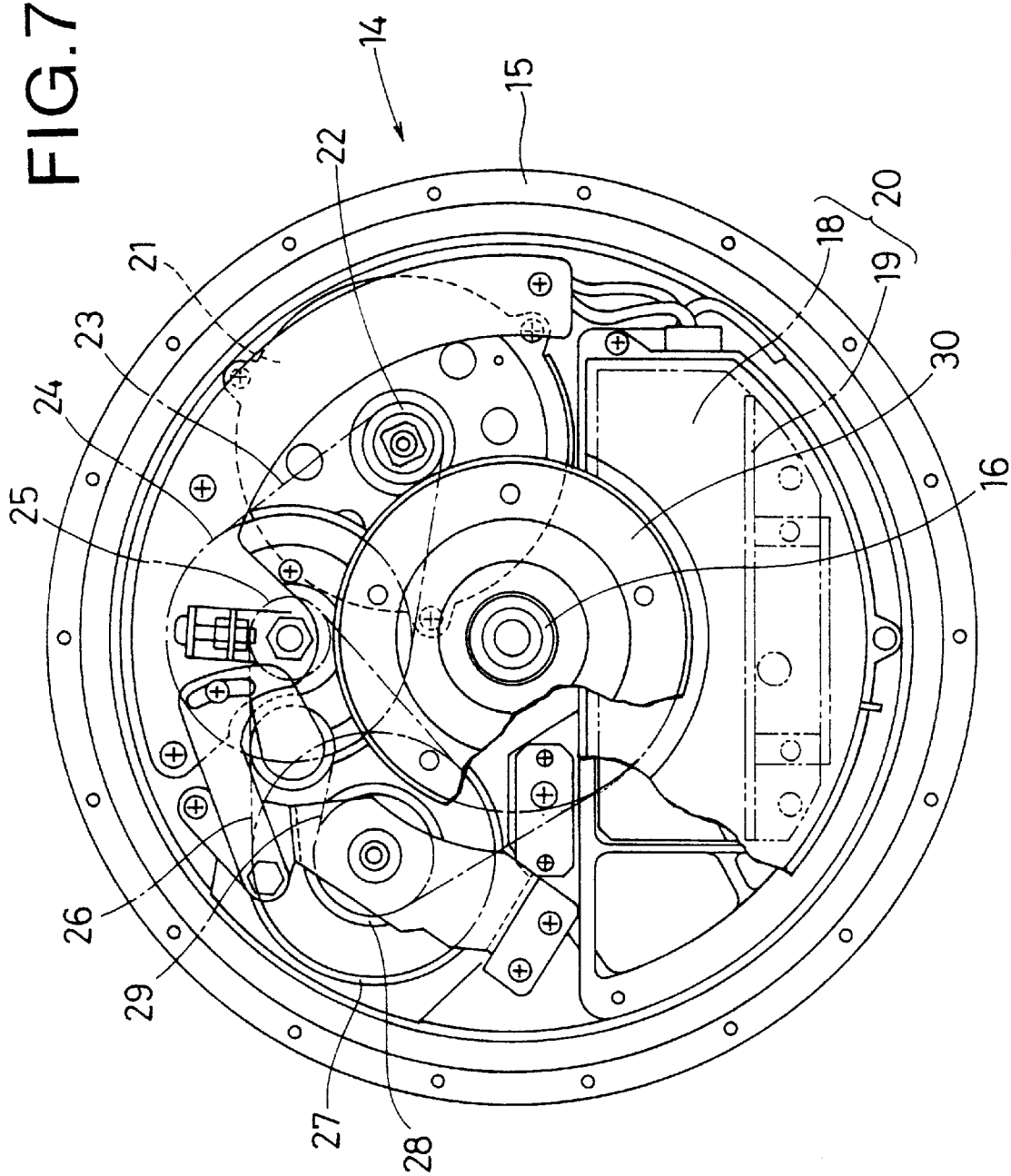
FIG. 7 is a side view showing the inside of the casing of FIG. 6.

FIG. 7 shows an inner structure of the casing 14. In FIG. 7, a controller 20 including an electric circuit board 18, a radiator board 19, and others and a motor 21 for auxiliarily driving the driving wheel 4 are mounted on the fixed-side casing member 15. The rotation of the motor 21 is reducingly transmitted to a motor pulley 22 mounted on the motor shaft, a first belt 23, a first pulley 24 mounted on the fixed-side casing member 15 in the vicinity of the motor 21, a second pulley 25 disposed coaxially with the first pulley 24, a second belt 26, a third pulley 27 mounted on the fixed-side casing member 15 in the vicinity of the second pulley 25, a fourth pulley 28 disposed coaxially with the third pulley 27, a third belt 29, and a fifth pulley 30 (a final decelerating member) disposed integrally with the hub shell 16. When the fifth pulley 30 rotates, the rotative-side casing member 17, the driving wheel 4, and the handrim 6 rotate together with the fifth pulley 30.

Figure 8:
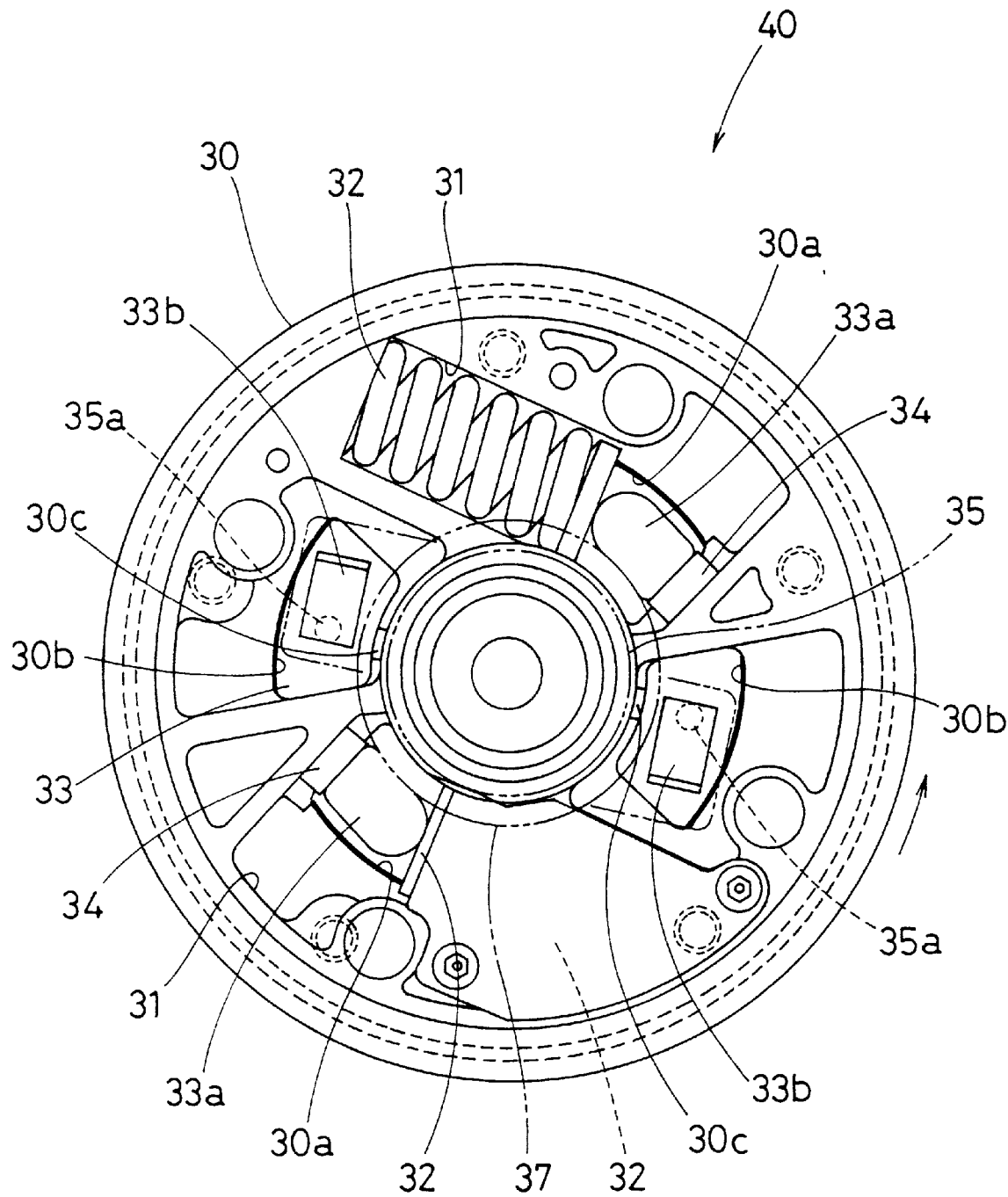
FIG. 8 is a side view showing a handrim driving-force detector disposed inside the casing of FIG. 6.
Figure 9:
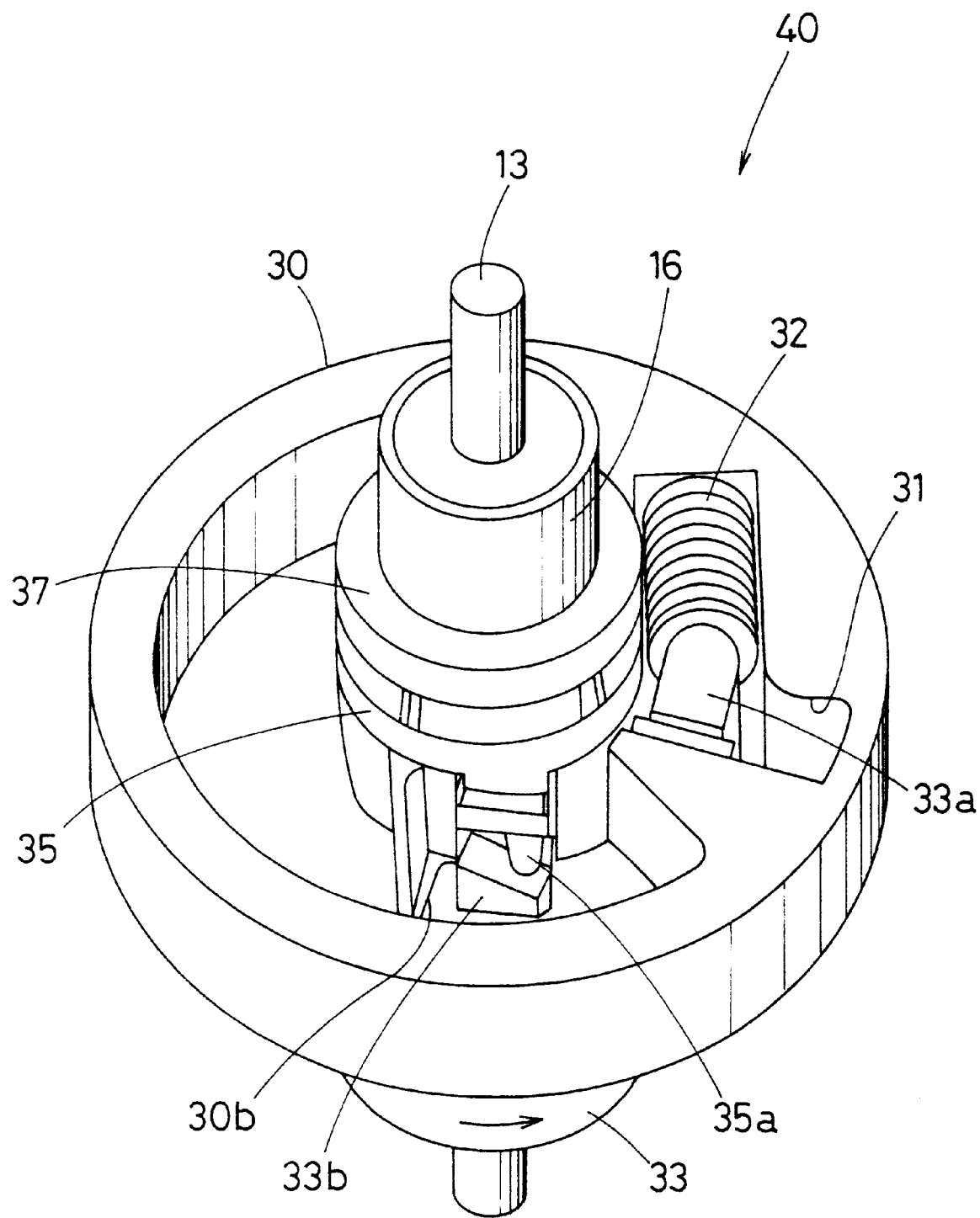
FIG. 9 is a perspective view showing the handrim driving-force detector of FIG. 8.
Figure 10:
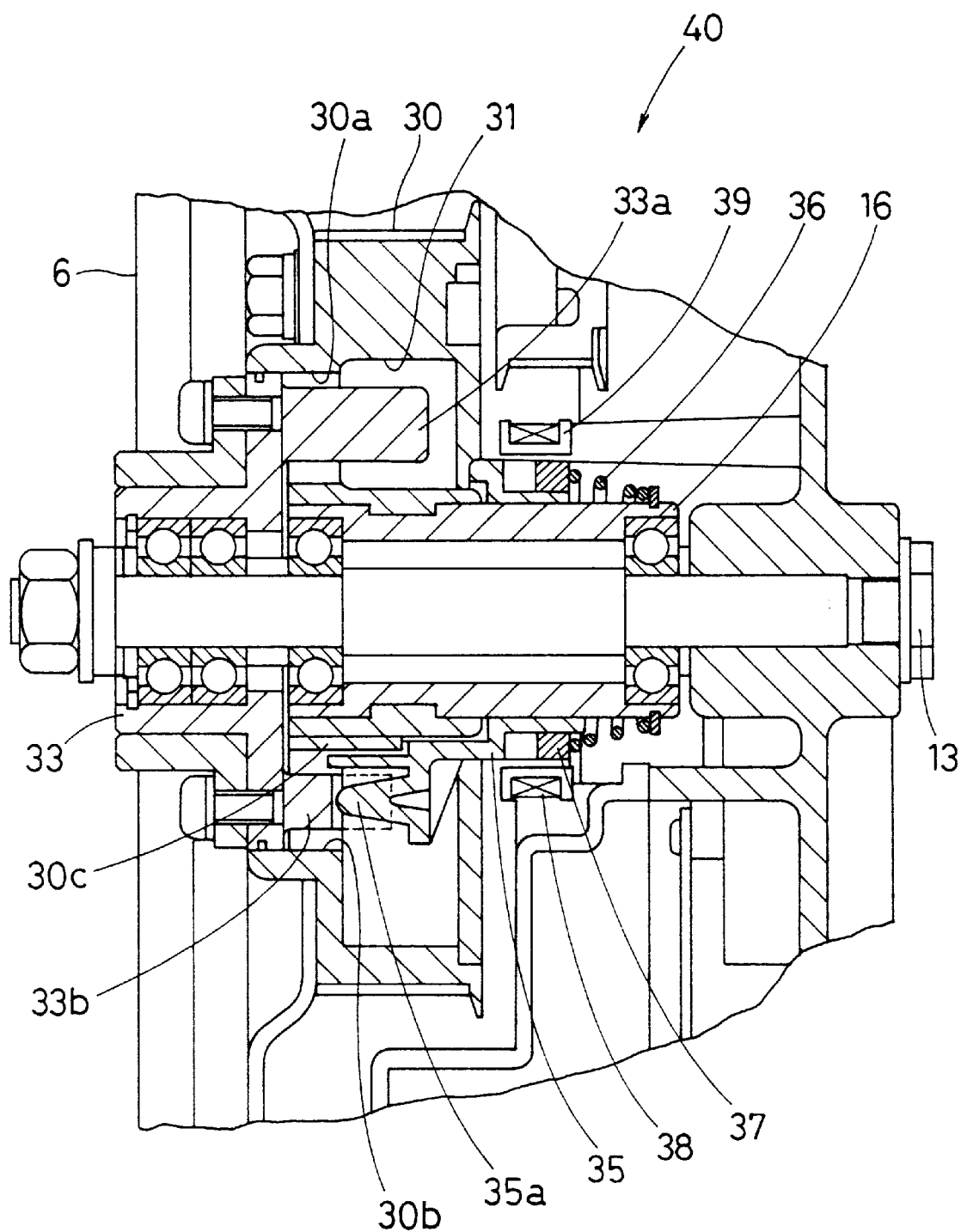
FIG. 10 is a rear sectional view showing the handrim driving-force detector of FIG. 8.

Next, the structure and the function of the handrim driving-force detector 40 for detecting the human driving force applied to the handrim 6 will be explained referring to FIGS. 8 to 10. In the fifth pulley 30, at pointwise symmetrical positions with respect to the hub shaft 13, there are provided two recessed portions 31, 31 having a depth approximately the same as the thickness of the fifth pulley 30. Into the recessed portions 31, 31 are fitted compression-type coil springs 32, 32, respectively, serving as elastic bodies which constitute a part of the driving force detector 40.

The coil spring 32 is disposed with its expanding and contracting directions approximately parallel to the tangential direction of the hub shaft 13. One end of the coil spring 32 is allowed to abut against one end wall of the recessed portion 31, and the other end thereof serves as a free end.

The reference numeral 33 represents a disk-like pressing operation board which serves as one element of the converting member constituting a portion of the driving force detector 40, the disk-like pressing operation board being integral with the handrim 6 and combined with the fifth pulley 30. The pressing operation board 33 has a pair of pressing portions 33a, 33a and a pair of operation portions 33b, 33b projecting to the fifth pulley 30 side at pointwise symmetrical positions with respect to the hub shaft 13. The pressing portion 33a and the operation portion 33b of the pressing operation board 33 are loosely fitted respectively into two approximately sectorial through-bores 30a and 30b formed in the fifth pulley 30 so that the pressing portion 33a and the operation portion 33b may be rotatable by a length of the circumference of the through-bores 30a and 30b.

The pressing portion 33a is prismatic and, when the driving wheel 4 is at rest, a rounded side of the pressing portion 33a abuts against the free end of the coil spring 32 by an urging power of the coil spring 32, and the other square side of the pressing portion 33a abuts against a rubber board 34 mounted on the other end of the recessed portion 31 and serving as a cushioning member. The operation portion 33b is prismatic having a height lower than that of the pressing portion 33a. The upper surface of the operation portion 33b is formed so as to be downwardly inclined in the rotation direction shown by an arrow in FIGS. 8 and 9 (the direction of the positive rotation of the handrim 6 and the pressing operation board 33).

Since the fifth pulley 30 and the pressing operation board 33 are constructed and disposed as above, the pressing portion 33a presses the coil spring 32 to allow the pressing operation board 33 to rotate in the positive direction within a predetermined range (the range of the length of the circumference of the through-bores 30a and 30b) when the human driving force applied to the pressing operation board 33 from the handrim 6 in the positive direction (the forward direction) surpasses the urging force of the coil spring 32. The pressing operation board 33 may also rotate in accordance with the rotation of the fifth pulley 30.

The reference numeral 35 represents a ring-like slide assembly which serves as the other element of the converting member constituting a portion of the driving force detector 40, the ring-like slide assembly being loosely fitted into the hub shell 16. A part of the slide assembly 35 is fitted to two guides 30c, 30c provided on the fifth pulley 30. These guides 30c, 30c allow the slide assembly 35 to slide along the direction of the hub shaft 13 only. On one end of the slide assembly 35, there is coveringly fixed a ring 37 made of ferrite which is a magnetic material serving as one element of the detecting member constituting a portion of the driving force detector 40. The slide assembly 35 and the ring 37 are all the time urged in the direction of the pressing operation board 33 by one end of a compression-type coil spring 36 having the other end fixed to the hub shell 16.

The slide assembly 35 includes, on the other end thereof, a pair of conical projections 35a, 35a projecting toward the operation portion 33b of the pressing operation board 33 at pointwise symmetrical positions with respect to the central axis. The projection 35a always abuts against the inclined surface at the operation portion 33b of the pressing operation board 33 by an urging power of the coil spring 36.

The reference numeral 38 represents a coil which serves as the other element of the detecting member constituting a portion of the driving force detector 40, the coil being disposed in the outside vicinity of the ring 37. The ring 37 is adapted to move through the inside of a coil bobbin 39 on which the winding of the coil 38 is wound.

Next, referring to FIGS. 8 to 10 again, explanations will be given on the detection of the human driving force by the handrim 6 and the control for adding a predetermined electric driving force to the driving wheel 4 based on the result of the detection.

When the wheelchair D at its stationary state is to be started, the user grips the handrims 6, 7 and tries to rotate them forward (in the positive direction). At this moment, the driving wheels 4, 5 are in contact with the ground or the floor, so that a great force is exerted to the driving wheels 4, 5 due to the friction with the ground or the floor. Accordingly, a human driving force of the user in the positive direction is applied to the pressing operation board 33 which is integral with the handrims 6, 7 before the driving wheels 4, 5 start to rotate. When the human driving force exceeds a predetermined amount, i.e. surpasses the urging force of the coil spring 32, then the pressing portion 33a presses the coil spring 32 and the pressing operation board 33 rotates in the positive direction by a predetermined amount.

Thus, when the pressing operation board 33 rotates in the positive direction with the pressing portion 33a pressing the coil spring 32 to contract, the operation portions 33b, 33b also rotate in the positive direction by a predetermined amount, so that the inclined surface portion at the operation portions 33b, 33b pushes the projections 35a, 35a of the slide assembly 35, whereby the slide assembly 35 together with the ring 37 slidingly moves away from the pressing operation board 33 against the urging force of the coil spring 36.

Then, the ring 37 moves through the inside of the coil bobbin 39 away from the pressing operation board 33, whereby the inductance of the coil 38 changes to vary the voltage applied to the coil 38. In other words, as the human driving force applied to the handrims 6, 7 increases, the volume of ring 37 inserted into the coil bobbin 39 increases,, thereby providing a larger inductance. When the inductance increases, the voltage decreases. When the inductance decreases, the voltage increases. Accordingly, by detecting the change in the voltage, it is possible to detect the amount of the human driving force. In accordance with the human driving force thus detected, the motor 21 is controlled by a microcomputer comprising a memory stored previously in the electric circuit board 19 of the controller 20.

The controlling method used herein is as follows. When the forward-travelling speed of the wheelchair D on a flat land or a downward slope is within the range of 0 to 2 km/h (0<v≦2 km/h: the first speed range), the controller 20 adds an electric driving force from the motor 21 so that the amount of the electric driving force will be identical to the amount of the detected human driving force. In other words, the ratio of the electric driving force to the human driving force is controlled to be equal to 1.0. When the travelling speed is within the range of 2 to 4 km/h (2<v≦4 km/h: the second speed range), the ratio of the electric driving force to be added is decreased linearly in the range of 1.0 to 0 in accordance with the increase of the speed. When the travelling speed exceeds 4 km/h (i.e. exceeds the second speed range: v>4 km/h), the electric driving force is not added.

When the forward-travelling speed of the wheelchair D on an upward slope is within the first speed range, the controller 20 adds an electric driving force from the motor 21 at a value of 20% (a predetermined ratio) more than the detected human driving force. In other words, the ratio of the electric driving force to the human driving force is controlled to be equal to 1.2. When the travelling speed is within the second speed range, the ratio of the electric driving force to be added is decreased linearly in the range of 1.2 to 0 in accordance with the increase of the speed. When the travelling speed exceeds the second speed range, the electric driving force is not added.

Here, the first speed range and the second speed range are not limited to the above ones, and may be suitably adjusted to be, for example, 0 to 3 km/h and 3 to 6 km/h, respectively, depending on the needs.

Usually, the user judges whether the wheelchair D is travelling forward on a flat land or downward slope or travelling forward on an upward slope. Namely, when the user turns the first switch 12a to "on (for assist)" and the second switch 12b to "flat land downward slope", it is assumed that the wheelchair D is travelling forward on a flat land or a downward slope and the corresponding control shown above is carried out. When the user turns the first switch 12a to "on (for assist)" and the second switch 12b to "upward slope", it is assumed that the wheelchair D is travelling forward on an upward slope and the corresponding control shown above is carried out.

Now, the state in which the wheelchair D is travelling forward and the user is not operating the handrims 6, 7 will be explained. At this state, since there is no human driving force applied, the pressing portion 33a of the pressing operation board 33 does not press the coil spring 32 to contract. Therefore, the above-mentioned rotation of the pressing operation board 33 does not occur, so that the slide assembly 35 and the ring 37 do not move. Consequently, the inductance of the coil 38 does not change, and the voltage applied to the coil 38 does not change, either. As a result of this, the electric driving force from the motor 21 is not added to the driving wheels 4, 5.

Next, the state in which the user accelerates the wheelchair D on a flat land or on an upward slope by operating the handrims 6, 7 will be explained. In this case, the pressing portion 33a presses the coil spring 32 to contract when the human driving force exceeds a predetermined value as in the previously-mentioned case of starting the travel. Consequently, the pressing operation board 33 rotates in accordance with the amount of human driving force applied to the handrims 6, 7, whereby the slide assembly 35 and the ring 37 move to change the voltage applied to the coil 38, so that the electric driving force is added to the driving wheels 4, 5 by the motor 21.

When the user turns the first switch 12a to "off", the electric driving force from the motor 21 is not added to the driving wheels 4, 5, so that the wheelchair D is driven only by the human driving force of the user applied to the handrims 6, 7.

Figure 11:
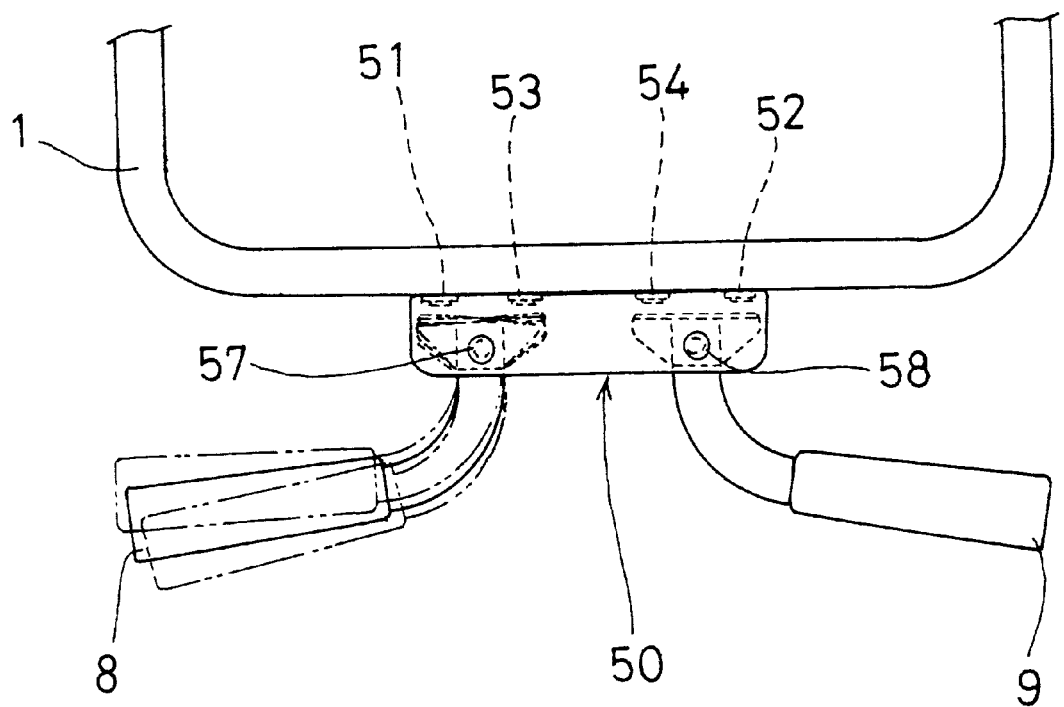
FIG. 11 is a plan view showing a handle driving-force detector disposed on the upper rear portion of the frame assembly in the wheelchair of FIG. 1.
Figure 12:
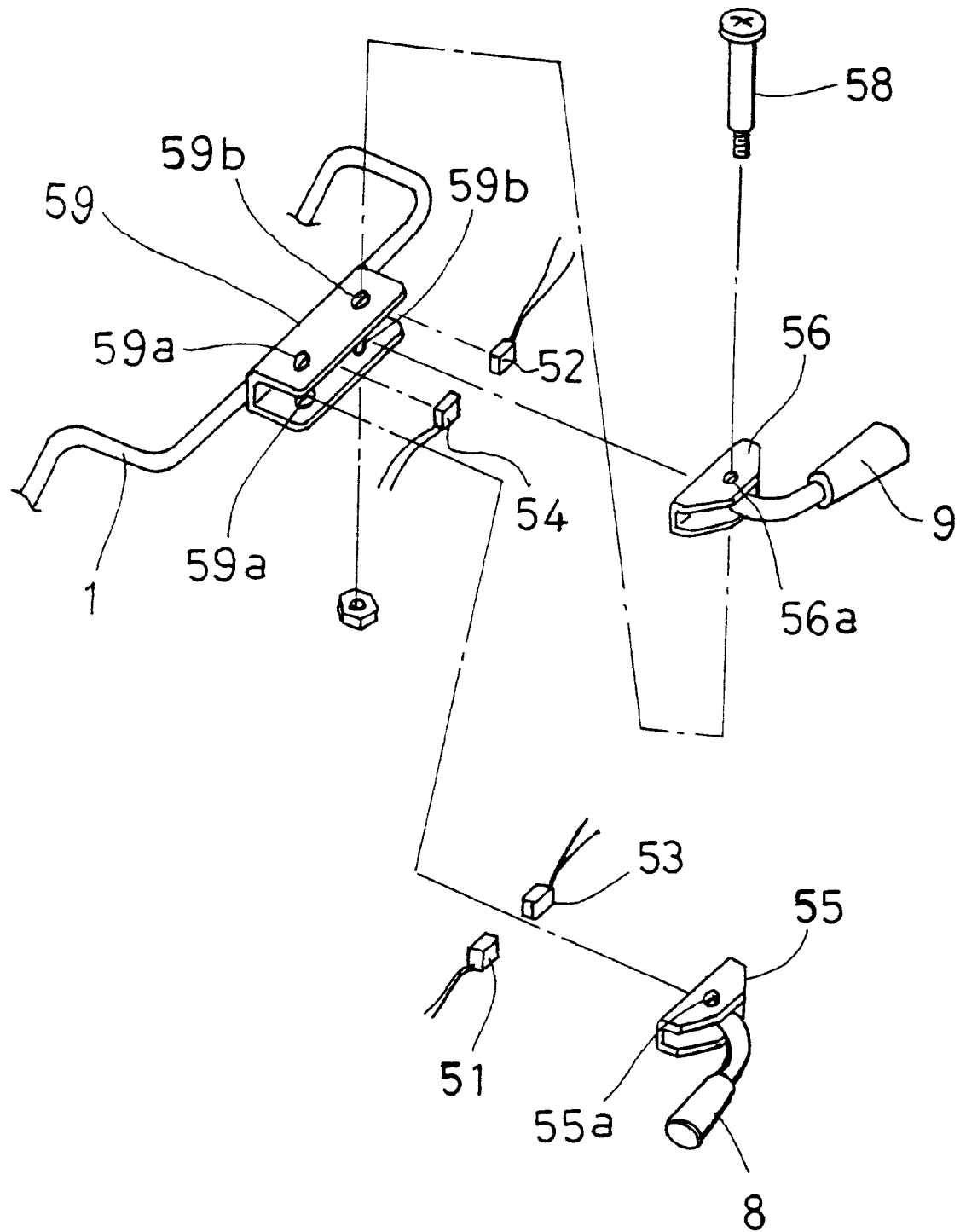
FIG. 12 is an exploded perspective view showing the handle driving-force detector of FIG. 11.

Next, based on FIGS. 11 and 12, an explanation will be given on the structure and the function of a handle driving-force detector 50 for detecting the human driving force applied to the handles 8, 9 when it exceeds a predetermined value. The driving force detector 50 comprises a pair of right and left pushing-pressure sensors 51, 52 for detecting the amount of pushing pressure applied to the handles 8, 9 and a pair of right and left pulling-pressure sensors 53, 54 for detecting the amount of pulling pressure applied to the handles 8, 9. These pressure sensors 51, 52, 53, 54 are electrically connected to the motor 21 via the controller 20.

The planar shape of the handles 8, 9 is generally J-shaped. The reference numerals 55 and 56 represent a pair of right and left handle attachments. The handle attachments 55, 56 include shaft-bores 55a, 56a provided therein, respectively. The reference numeral 59 represents a detector attachment having a side view of an open-square (open-box) shape and being mounted on the middle of an upper rear portion of the frame assembly 1. The detector attachment 59 includes shaft-bores 59a, 59a, 59b, 59b provided therein. The handles 8, 9 are mounted to the pivot shafts 57, 58, respectively, which penetrate through the shaft-bores 59a, 59a, 59b, 59b of the detector attachment 59 and through the shaft-bores 55a, 56a of the handle attachments 55, 56, in such a manner that the handles 8, 9 are approximately horizontal and pivotable in forward and backward directions. The pressure sensors 51, 52, 53, 54 are disposed between the front surface of the handle attachments 55, 56 and the rear surface of the detector attachment 59.

When the assistant pushes the handles 8, 9 with a human power that exceeds a predetermined amount, the handles 8, 9 pivot forward around the pivot shafts 57, 58, whereby the pushing pressure sensors 51, 52 detect the movement thereof. This enables detection of the forward-pushing human driving force applied to the handles 8, 9 by the assistant. On the other hand, when the assistant pulls the handles 8, 9 with a human power that exceeds a predetermined amount, the handles 8, 9 pivot backward around the pivot shafts 57, 58, whereby the pulling pressure sensors 53, 54 detect the movement thereof. This enables detection of the backward-pulling human driving force applied to the handles 8, 9 by the assistant.

When the forward-travelling speed of the wheelchair D on a flat land or a downward slope is within the first speed range (0<v≦2 km/h), the controller 20 adds an electric driving force from the motor 21 so that the amount of the electric driving force will be identical to the amount of the detected human driving force. In other words, the ratio of the electric driving force to the human driving force is controlled to be equal to 1.0. The speed at which the assistant walks while pushing the wheelchair D is about 2 to 4 km/h. Therefore, when the travelling speed of the wheelchair D is within the second speed range (2<v≦4 km/h), the ratio of the electric driving force to be added is decreased linearly in the range of 1.0 to 0 in accordance with the increase of the speed. When the travelling speed exceeds the second speed range (v>4 km/h), the electric driving force is not added.

When the forward-travelling speed of the wheelchair D on an upward slope is within the first speed range, the controller 20 adds an electric driving force from the motor 21 at a value of 20% more than the detected human driving force. In other words, the ratio of the electric driving force to the human driving force is controlled to be equal to 1.2. When the travelling speed is within the second speed range, the ratio of the electric driving force to be added is decreased linearly in the range of 1.2 to 0 in accordance with the increase of the speed. When the travelling speed exceeds the second speed range, the electric driving force is not added.

Usually, the user judges whether the wheelchair D is travelling forward on a flat land or downward slope or travelling forward on an upward slope, in the same manner as in the case of the above handrims 6, 7.

In these cases of forward travelling, the output of the motors 21, 21 housed in the right and left casings 14, 14 is controlled in accordance with the amount of pushing pressure by the right and left handles 8, 9, whereby the right and left driving wheels 4, 5 are auxiliarily driven.

Next, an explanation will be given on the control when the wheelchair D gains a dangerous speed (for example, 6 km/h) in travelling on a downward slope with the assistant pushing the wheelchair D. When the assistant judges that the speed of the wheelchair D is increasing and becoming dangerous, the assistant pulls the handles 8, 9 to decrease the speed. If the force pulling the handles 8, 9 exceeds a predetermined value, the pulling-pressure sensors 53, 54 detect the force.

Then, the controller 20 directs a dynamoelectric braking to the motors 21, 21 in accordance with the amount of pressure pulling backward (pulling pressure) applied to the handles 8, 9. For example, if the speed is within the range of 0 to 4 km/h ($0<v\leq 4$ km/h), the dynamoelectric braking is applied at the ratio of 0.2 relative to the pulling pressure. If the speed is within the range of 4 to 6 km/h ($4<v\leq 6$ km/h), the dynamoelectric braking is gradually applied, in direct proportion to the speed, at the ratio of 0.2 to 1.0 relative to the pulling pressure. If the speed exceeds the dangerous value of 6 km/h ($v>6$ km/h), the maximum dynamoelectric braking is applied with the ratio of the dynamoelectric braking to the pulling pressure being equal to 1.0.

Here, even if only one of the right and left pulling-pressure sensors 53, 54 detects the pressure, the dynamoelectric braking is applied to both of the right and left motors 21, 21. This is because, if only one of the right and left pulling-pressure sensors 53, 54 detects the pressure and the dynamoelectric braking is applied to only the corresponding one of the right and left motors 21, 21, the wheelchair D will spin to the right side or the left side, hence dangerous.

Being constructed as shown above, the wheelchair D of the present invention has the following advantages.

Namely, the wheelchair D comprises a driving-force detector 40 for detecting a human driving force applied to the handrims 6, 7 when it exceeds a predetermined amount (coil springs 32, 32 serving as elastic bodies, a pressure operation board 33 serving as one element of the converting member, a ring-like slide assembly 35 serving as the other element of the converting member, a ring 37 serving as one element of the detecting member, and a coil 38 serving as the other element of the detecting member) and a controller 20 for controlling the motor 21 based on the result of the detection by the driving-force detector 40 so as to add or not to add a predetermined amount of electric driving force to the driving wheels 4, 5. The controller 20 controls the motor 21 in accordance with the amount of the detected human driving force to add or not to add an electric driving force to the driving wheels 4, 5. Accordingly, the wheelchair D does not require so much manual labor of the user operating the handrims 6, 7. Also, since the wheelchair D does not require such a large capacity battery as those used in the electric wheelchairs, the weight and the size of the entire wheelchair are not as large as those of the electric wheelchairs, so that it is comparatively easy to load the wheelchairs onto an automobile or a truck.

Further, the driving force detector 40 comprises coil springs 32, 32 that contract when a human driving force exceeding a predetermined amount is applied to the handrims 6, 7 and expand otherwise, a converting member (a pressure operation board 33 and a slide assembly 35) for converting the amount of contraction or expansion of the coil springs 32, 32 into a shift amount along the longitudinal direction of the hub shaft 13 of the driving wheels 4, 5, and a detecting member (a ring 37 and a coil 38) for generating a voltage change in accordance with the shift amount of the converting member and detecting the amount of the voltage change. Accordingly, by converting the change of the human driving force into the shift amount along the longitudinal direction of the hub shaft 13, it is possible to enlarge the degree of change, thus enabling an accurate and fine detection.

In addition, when the assistant pushes the handles 8, 9 with a human power that exceeds a predetermined amount, the handles 8, 9 pivot forward around the pivot shafts 57, 58, whereby the pushing pressure sensors 51, 52 detect the forward-pushing human driving force applied to the handles 8, 9 by the assistant. On the other hand, when the assistant pulls the handles 8, 9 with a human power that exceeds a predetermined amount, the handles 8, 9 pivot backward around the pivot shafts 57, 58, whereby the pulling pressure sensors 53, 54 detect the backward-pulling human driving force applied to the handles 8, 9 by the assistant. Accordingly, it is possible to apply an auxiliary driving force to the motors 21, 21 in accordance with the human driving force of the assistant pushing the wheelchair D, so that the wheelchair D does not require so much manual labor of the assistant pushing the handles 8, 9. Moreover, when the wheelchair D gains a dangerous speed in travelling on a downward slope, a predetermined dynamoelectric braking is applied to the driving wheels 4, 5, thus securing a safety travelling.

What we claim is:

1. A wheelchair comprising:
    a main body having a seat for a user and a driving wheel;
    a handle provided in the main body for propelling the main body by a human driving force of an assistant;
    a motor for auxiliarily driving the driving wheel by an electric driving force, and a battery for supplying a power to the motor;
    a handle driving-force detector for detecting the human driving force applied to the handle; and
    a controller for controlling the motor reflecting a result of the detection by the handle driving-force detector, whereby the electric driving force can be added to the driving wheel in accordance with the human driving force applied to the handle; and
    the main body includes a changeover switch for changing the operation/non-operation of the motor and the flat land or downward slope traveling/upward slope traveling, based in a judgement of the user or the assistant.

2. A wheelchair according to claim 1, in which the handle is provided as a pair of right and left handles mounted to the upper rear portion of the main body and the handle driving-force detector is provided at the upper rear portion of the main body, the handles being approximately horizontal and pivotable in forward and backward directions so that the handles pivot in a forward or backward direction when the handles are pushed or pulled by the assistant, thereby operating the handle-driving force detector.

3. A wheelchair according to claim 1, in which the handle driving-force detector comprises a pushing-pressure sensor disposed between the handle and the main body, the pushing-pressure sensor detecting the amount of the force pushing the handle forward, and a pulling-pressure sensor disposed between the handle and the main body, the pulling-pressure sensor detecting the amount of the force pulling the handle backward, and the handle driving-force detector being electrically connected to the motor via the controller.

4. A wheelchair according to claim 1, in which, when the operation of the motor and the flat land or downward slope traveling are selected by the changeover switch, the controller controls the motor so as to add an electric driving force at an amount equal to the amount of the detected human driving force when the forward traveling speed is within a first speed range, to add an electric driving force at an amount smaller by a predetermined ratio than the amount of the detected human driving force when the forward traveling speed is within a second speed range which is greater than the first speed range, and to add no electric driving force when the forward traveling speed exceeds the second speed range.

5. A wheelchair according to claim 1, in which, when the operation of the motor and the upward slope traveling are selected by the changeover switch, the controller controls the motor so as to add an electric driving force at an amount larger by a predetermined ratio than the amount of the detected human driving force when the forward traveling speed is within a first speed range, to add an electric driving force at a ratio smaller than the predetermined ratio for the first speed range to the amount of the detected human driving force when the forward traveling speed is within a second speed range which is greater than the first speed range, and to add no electric driving force when the forward traveling speed exceeds the second speed range.

6. A wheelchair comprising:
  a main body having a seat for a user and a driving wheel;
  a handle provided in the main body for propelling the main body by a human driving force of an assistant;
  a motor for auxiliarily driving the driving wheel by an electric driving force, and a battery for supplying a power to the motor;
  a handle driving-force detector for detecting the human driving force applied to the handle; and
  a controller for controlling the motor reflecting a result of the detection by the handle driving-force detector, whereby the electric driving force can be added to the driving wheel in accordance with the human driving, force applied to the handle;
  the handle driving-force detector comprises a pulling-pressure sensor disposed between the handle and the main body, the pulling-pressure sensor detecting the amount of the force pulling the handle backward;
  the handle driving-force detector being electrically connected to the motor via the controller; and
  the controller further has a function of directing a dynamoelectric breaking to the motor in accordance with a result of the detection by the pulling-pressure sensor.

7. A wheelchair comprising:
  a main body having a seat for a user and a driving wheel;
  a handle provided in the main body for propelling the main body by a human driving force of an assistant;
  a motor for auxiliarily driving the driving wheel by an electric driving force, and a battery for supplying a power to the motor;
  a handle driving-force detector for detecting the human driving force applied to the handle; and
  a controller for controlling the motor reflecting a result of the detection by the handle driving-force detector whereby the electric driving force can be added to the driving wheel in accordance with the human driving force applied to the handle;
  a handrim provided integrally with the driving wheel for driving the driving wheel with the human driving force of the user;
  a handrim driving-force detector for detecting the human driving force applied to the handrim; and
  the controller further having a function of controlling the motor reflecting a result of the detection by the handrim driving-force detector, whereby the electric driving force can be added to the driving wheel in accordance with the human driving force applied either to the handle or to the handrim.

8. A wheelchair according to claim 7, in which the handrim driving-force detector comprises an elastic body that contracts when a human driving force exceeding a predetermined amount is applied to the handrim and expands otherwise, a converting member for converting the amount of contraction or expansion of the elastic body into a shift amount along the longitudinal direction of a hub shaft of the driving wheel, and a detecting member for generating an electric output change in accordance with the shift amount of the converting member and for detecting the output.

9. A wheelchair according to claim 7, in which a hub shaft of the driving wheel is protected by a disk-like casing divided into right and left portions, one of the divided portions being fixed to the hub shaft to serve as a fixed-side casing member, the inside of the fixed-side casing member including the motor and the controller disposed therein, the other of the divided portions being mounted to the hub shell covering the hub shaft to serve as a rotative-side casing member rotatable with the driving wheel, the inside of the rotative-side casing member including a final decelerating member disposed therein for reducing the rotating speed of the motor to a predetermined value and for rotating to drive the rotative-side casing member, with the inside of the fixed-side casing member and the rotative-side casing member including the handrim driving-force detector disposed therein.

10. A wheelchair comprising:
  a main body having a seat for a user and a driving wheel;
  a handle provided in the main body for propelling the main body by a human driving force of an assistant;
  a motor for auxiliarily driving the driving wheel by an electric driving force, and a battery for supplying a power to the motor;
  a handle driving-force detector for detecting the human driving force applied to the handle;
  said handle driving-force detector effective to produce a detector signal corresponding to an amount of the human driving force applied to the handle;
  a controller for controlling the motor so as to add and remove the electric driving force in proportion to the detector signal, whereby the electric driving force can be added to the driving wheel when the human driving force is applied to the handle;
  the handle driving-force detector includes a pulling-pressure sensor disposed between the handle and the main body;

the pulling-pressure sensor detects the amount of the force pulling the handle backward; and the handle driving-force detector being electrically connected to the motor via the controller, and in which the controller further has a function of directing a dynamo-electric braking to the motor in accordance with a result of the direction by the pulling-pressure sensor.

11. A wheelchair comprising:

a main body having a seat for a user and a driving wheel;

a handle provided in the main body for propelling the main body by a human driving force of an assistant;

a motor for auxiliarily driving the driving wheel by an electric driving force, and a battery for supplying a power to the motor;

a handle driving-force detector for detecting the human driving force applied to the handle;

said handle driving-force detector effective to produce a detector signal corresponding to an amount of the human driving force applied to the handle;

a controller for controlling the motor so as to add and remove the electric driving force in proportion to the detector signal, whereby the electric driving force can be added to the driving wheel when the human driving force is applied to the handle; and the main body includes a changeover switch for changing the operation/non-operation of the motor and the flat land or downward slope traveling/upward slop traveling, based in a judgement of the user or the assistant.

12. A wheelchair according to claim 11, in which, when the operation of the motor and the flat land or downward slope traveling are selected by the changeover switch, the controller controls the motor so as to add an electric driving force at an amount equal to the amount of the detected human driving force when the forward traveling speed is within a first speed range, to add an electric driving force at an amount smaller by a predetermined ratio than the amount of the detected human driving force when the forward traveling speed is within a second speed range which is greater than the first speed range, and to add no electric driving force when the forward traveling speed exceeds the second speed range.

13. A wheelchair according to claim 11, in which, when the operation of the motor and the upward slope traveling are selected by the changeover switch, the controller controls the motor so as to add an electric driving force at an amount larger by a predetermined ratio than the amount of the detected human driving force when the forward traveling speed is within a first speed range, to add an electric driving force at a ratio smaller than the predetermined ratio for the first speed range to the amount of the detected human driving force when the forward traveling speed is within a second speed range which is greater than the first speed range, and to add no electric driving force when the forward traveling speed exceeds the second speed range.

14. A wheelchair comprising:

a main body having a seat for a user and a driving wheel;

a handle provided in the main body for propelling the main body by a human driving force of an assistant;

a motor for auxiliarily driving the driving wheel by an electric driving force, and a battery for supplying a power to the motor;

a handle driving-force detector for detecting the human driving force applied to the handle;

said handle driving-force detector effective to produce a detector signal corresponding to an amount of the human driving force applied to the handle, a controller for controlling the motor so as to add and remove the electric driving force in proportion to the detector signal, whereby the electric driving force can be added to the driving wheel when the human driving force is applied to the handle;

a handrim provided integrally with the driving wheel for driving the driving wheel with the human driving force of the user;

a handrim driving-force detector for detecting the human driving force applied to the handrim;

the controller further having a function of controlling the motor reflecting a result of the detection by the handrim driving-force detector, whereby the electric driving force can be added to the driving wheel in accordance with the human driving force applied either to the handle or to the handrim;

the handrim driving-force detector having an elastic body that contracts when a human driving force exceeding a predetermined amount is applied to the handrim and expands otherwise, a converting member for converting the amount of contraction or expansion of the elastic body into a shift amount along the longitudinal direction of a hub shaft of the driving wheel, and a detecting member for generating an electric output change in accordance with the shift amount of the converting member and for detecting the output.

15. A wheelchair comprising:

a main body having a seat for a user and a driving wheel;

a handle provided in the main body for propelling the main body by a human driving force of an assistant;

a motor for auxiliarily driving the driving wheel by an electric driving force, and a battery for supplying a power to the motor;

a handle driving-force detector for detecting the human driving force applied to the handle;

said handle driving-force detector effective to produce a detector signal corresponding to an amount of the human driving force applied to the handle;

a controller for controlling the motor so as to add and remove the electric driving force in proportion to the detector signal, whereby the electric driving force can be added to the driving wheel when the human driving force is applied to the handle, a handrim provided integrally with the driving wheel for driving the driving wheel with the human driving force of the user;

a handrim driving-force detector for detecting the human driving force applied to the handrim;

the controller further having a function of controlling the motor reflecting a result of the detection by the handrim driving-force detector, whereby the electric driving force can be added to the driving wheel in accordance with the human driving force applied either to the handle or to the handrim;

a hub shaft of the driving wheel is protected by a disk casing divided into right and left portions, one of the divided portions being fixed to the hub shaft to serve as a fixed-side casing member;

the inside of the fixed-side casing member including the motor and the controller disposed therein, the other of the divided portions being mounted to a hub shell covering the hub shaft to serve as a rotative-side casing member rotatable with the driving wheel; and the inside of the rotative-side casing member including a final decelerating member disposed therein for reducing the rotating speed of the motor to a predetermined value and for rotating to drive the rotative-side casing member, with the inside of the fixed-side casing member and the rotative-side casing member including the handrim driving-force detector disposed therein.

* * * * *